I. N. MANSFIELD.
COTTON CHOPPER.
APPLICATION FILED NOV. 2, 1911.
1,042,361.
Patented Oct. 22, 1912.
2 SHEETS—SHEET 1.
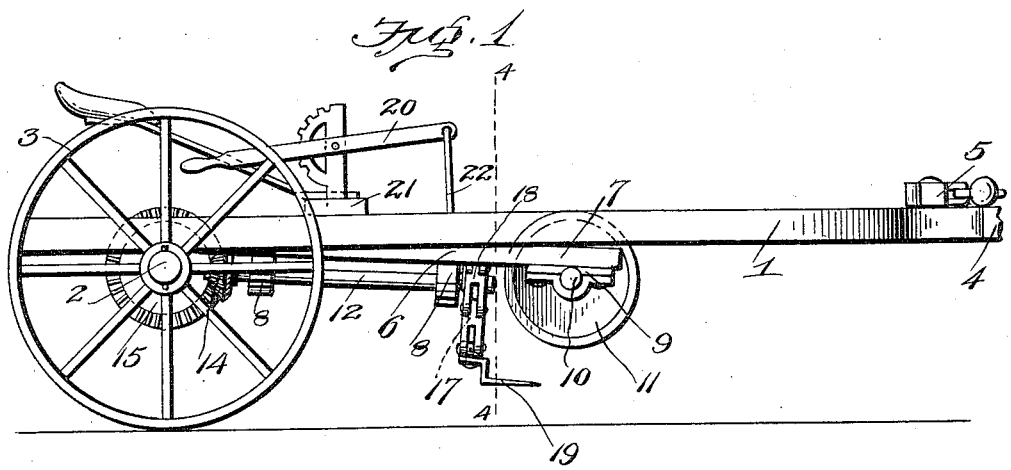
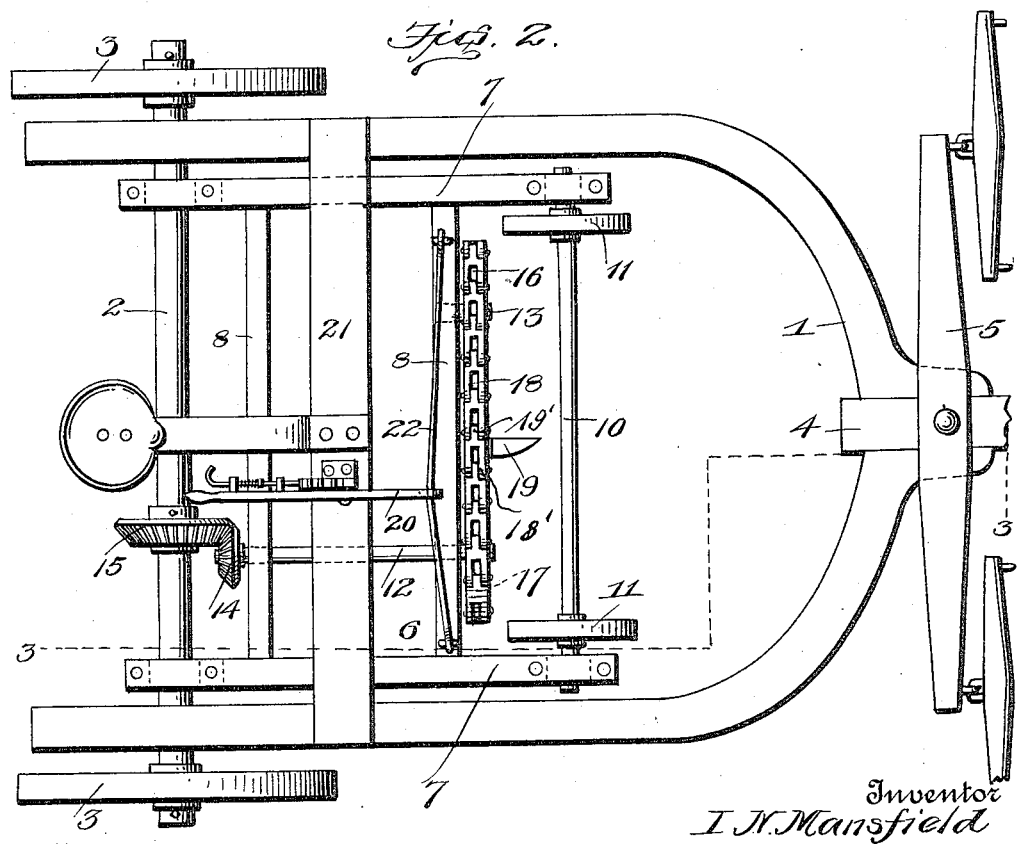

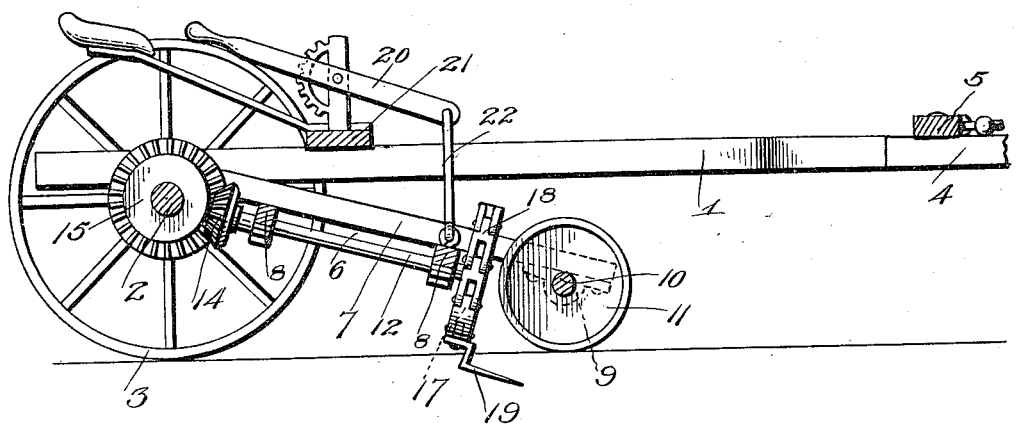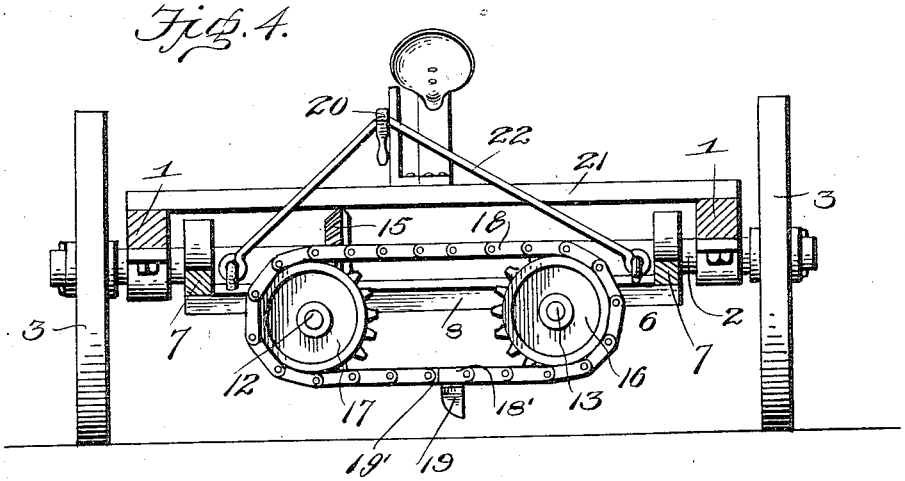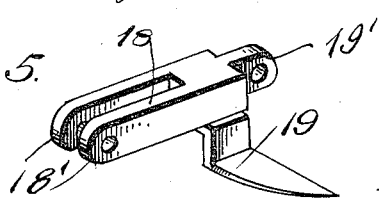

UNITED STATES PATENT OFFICE.

ISAAC N. MANSFIELD, OF SODDY, TENNESSEE.

COTTON-CHOPPER.

1,042,361.  Specification of Letters Patent.  Patented Oct. 22, 1912.

Application filed November 2, 1911. Serial No. 658,187.

*To all whom it may concern:*

Be it known that I, ISAAC N. MANSFIELD, a citizen of the United States, residing at Soddy, in the county of Hamilton and State of Tennessee, have invented certain new and useful Improvements in Cotton-Choppers; and I do declare the following to be a full, clear, and exact description of the invention, such as will enable others skilled in the art to which it appertains to make and use the same.

This invention relates to improvements in cotton choppers.

One object of the invention is to provide a cotton chopper having an improved construction and arrangement of cutting mechanism whereby the cotton or other plants may be effectually thinned out to the desired extent.

Another object is to provide a machine of this character having an improved means for adjustably supporting the operating mechanism whereby the latter may be lowered and raised to operative and inoperative positions.

With these and other objects in view the invention consists of certain novel features of construction, and the combination and arrangement of parts as will be more fully described and claimed.

In the accompanying drawings; Figure 1 is a side view of my improved cotton chopper showing the parts in a raised or inoperative position; Fig. 2 is a top plan view thereof; Fig. 3 is a vertical longitudinal section on the line 3—3 of Fig. 2 showing the parts lowered to an operative position; Fig. 4 is a vertical cross section on the line 4—4 of Fig. 1; Fig. 5 is a detail view of one of the links of the blade operating chain showing the chopping blade arranged thereon.

My improved cotton chopper comprises a main yoke shaped supporting frame 1 the rear ends of which have revolubly secured thereto a driving and supporting axle 2 having fixedly mounted on its outer ends main supporting wheels 3. To the outer end of the frame is connected a draft tongue 4 having secured thereto suitable draft trees 5 as shown.

Loosely mounted in the main frame 1 is an adjustable supplemental frame 6 adapted to carry the cotton chopping mechanism. The frame 6 comprises side bars 7 which are loosely connected at their inner ends to the shaft 2 and are connected together by cross bars 8. On the outer ends of the bars 7 are arranged bearings 9 in which is revolubly mounted a shaft 10 having fixed thereon frame supporting wheels 11 by means of which the frame 7 is supported when lowered to an operative position.

Revolubly mounted in suitable bearings in the bars 8 is a sprocket gear shaft 12. The shaft 12 extends across both of the cross bars 8 and has fixedly mounted on its rear end a bevel gear 14 which is operatively engaged with a similar gear 15 fixed on the axle 2 of the machine whereby the shaft 12 is driven by the axle. The shaft 13 is a short stub shaft and is secured in the front cross bar 8 in any suitable manner. On the stub shaft 13 is revolubly mounted a sprocket gear 16 while on the forward end of the shaft 12 is fixedly mounted a sprocket gear 17. The gears 16 and 17 are connected together by or have engaged therewith a sprocket chain 18 which moves in a plane transversely of the frame and to which is secured a chopping knife having a blade 19. The blade 19 projects forwardly in a plane at right angles to the plane of movement of the chain a suitable distance from the chain and has its inner end offset and formed at right angles to provide a blade attaching shank which is secured to the outer side to one of the links of the chain in any suitable manner. As clearly shown in Fig. 5, the cutting blade 19 projects from the solid intermediate portion of the link 18, and between the forked end 18' and connecting lug 19' of the same, whereby the proper cutting movement of the blade is obtained during the travel of the chain in various positions. The working edge of the blade is preferably formed on a slight curve whereby a wiping cut is made by the blade when brought into engagement with the plants thus causing the blade to be more readily operated. By thus constructing and arranging the chopping blade it will be seen that as the machine is drawn along over the row of plants to be thinned out that the blade will be successively brought around by the chain into engagement with the plants thus chopping out the latter at suitable intervals.

In order to lower and raise the chopping mechanism to operative and inoperative positions I provide a suitable rasing and lowering mechanism comprising a hand lever 20 which is suitably mounted on a cross bar 21 connecting the inner ends of the side bars 1 of the main frame and which is connected by raising and supporting rods or links 22 to the front cross bar 8 of the supplemental frame 6 whereby when said lever is operated the frame 6 and the chopping mechanism carried thereby may be lowered and raised and supported in the desired position. The lever 20 is provided with a suitable pawl and ratchet locking mechanism whereby the lever is held in its adjusted positions. When the frame 6 is lowered to bring the chopping mechanism to an operative position, said frame and chopping mechanism will be supported by the wheels 11 on the shaft 10 in the forward end of the frame, said wheels engaging and traveling on the ground on opposite sides of the rows of plants to be thinned. When not working or when the machine is to be drawn from place to place the chopping mechanism may be lifted up to a suitable distance above the surface of the ground by means of the lever 20 and its connections with the frame 6.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

Having thus described my invention what I claim is:

1. A cotton chopper including a frame having a chain mounted to move transversely thereof, and a knife projecting laterally from said chain in a plane at right angles to the plane of movement of said chain, said knife having an offset intermediate of its ends.

2. A cotton chopper knife comprising an attaching shank having a cutting blade offset therefrom and extending longitudinally in a line parallel therewith, said blade having a curved cutting edge adapting it to shear the plants to be removed.

In testimony whereof I have hereunto set my hand in presence of two subscribing witnesses.

ISAAC N. MANSFIELD.

Witnesses:
J. D. HOUTS,
W. H. FIELDS.

Copies of this patent may be obtained for five cents each, by addressing the "Commissioner of Patents, Washington, D. C."